(12) United States Patent
Endresen

(10) Patent No.: US 10,873,745 B1
(45) Date of Patent: Dec. 22, 2020

(54) EARLY INTRA CODING DECISION (PPH)

(71) Applicant: Pexip AS, Oslo (NO)

(72) Inventor: Lars Petter Endresen, Nesoddtangen (NO)

(73) Assignee: Pexip AS, Oslo (NO)

( * ) Notice: Subject to any disclaimer, the term of this patent is extended or adjusted under 35 U.S.C. 154(b) by 0 days.

(21) Appl. No.: 16/799,983

(22) Filed: Feb. 25, 2020

(30) Foreign Application Priority Data

Jun. 20, 2019 (NO) .................................. 20190764

(51) Int. Cl.
| | |
|---|---|
| *H04N 19/159* | (2014.01) |
| *H04N 19/107* | (2014.01) |
| *H04N 19/14* | (2014.01) |
| *H04N 19/176* | (2014.01) |
| *H04N 19/122* | (2014.01) |

(52) U.S. Cl.
CPC ......... *H04N 19/107* (2014.11); *H04N 19/122* (2014.11); *H04N 19/14* (2014.11); *H04N 19/176* (2014.11)

(58) Field of Classification Search
CPC .... H04N 19/107; H04N 19/122; H04N 19/14; H04N 19/176
See application file for complete search history.

(56) References Cited

U.S. PATENT DOCUMENTS

| | | | | | |
|---|---|---|---|---|---|
| 5,510,839 | A | * | 4/1996 | Hamano | H04N 21/236 |
| | | | | | 375/240.02 |
| 2005/0175099 | A1 | * | 8/2005 | Sarkijarvi | H04N 19/59 |
| | | | | | 375/240.16 |
| 2017/0195675 | A1 | | 7/2017 | Seok et al. | |
| 2018/0176601 | A1 | * | 6/2018 | Jeong | H04N 19/593 |
| 2019/0089952 | A1 | * | 3/2019 | Liu | H04N 19/46 |
| 2019/0281321 | A1 | * | 9/2019 | Zhao | H04N 19/186 |

FOREIGN PATENT DOCUMENTS

| | | |
|---|---|---|
| AU | 2017254861 A1 | 11/2017 |
| WO | 2004056125 A1 | 7/2004 |
| WO | 2012122286 A1 | 9/2012 |
| WO | 2017015312 A1 | 1/2017 |

OTHER PUBLICATIONS

Patentstyret, Norwegian Search Report, Patent Application No. 20190764, dated Jan. 16, 2020; consisting of 3-pages.
Norwegian Industrial Property Office, Office Action in Patent Application No. 20190764, dated Jan. 16, 2020; consisting of 6-pages.
(Continued)

*Primary Examiner* — Jonathan R Messmore
(74) *Attorney, Agent, or Firm* — Christopher & Weisberg, P.A.

(57) ABSTRACT

The present invention uses large intra blocks coding for uniform regions of the video by making early decision of intra block coding based on DCT and DC calculations. This has shown to increase the visual quality of uniform areas significantly, and by utilizing a possibility of parallel calculation, the extra processing cost for the early decision is insignificant.

12 Claims, 4 Drawing Sheets

(56) References Cited

OTHER PUBLICATIONS

Fernandez, D.G. et al., Complexity Reduction in the HEVC/H265 Standard Based on Smooth Region Classification, Digital Signal Processing, Feb. 2018, vol. 73, pp. 24-39, ISSN 1051-2004, published Nov. 7, 2017, Epoque Accession No. XP085309978; consisting of 16-pages.

Lemmetti, A. et al., AVX2-Optimized Kvazaar HEVC Intra Encoder, IEEE International Conference on Image Proceedings (ICIP), 2016, Phoenix, AZ, USA, pp. 549-553, Electronic ISSN: 2381-8549, published Sep. 25, 2016, Epoque Accession No. XP033016588; consisting of 5-pages.

He et al., "Transform-Based Fast Mode and Depth Decision Algorithm for HEVC Intra Prediction", IEEE, 2013, Graduate School of Information Production and Systems, Waseda University; consisting of 4-pages.

Wei et al., "Fast Depth Decision with Enlarged Coding Block Sizes for HEVC Intra Coding of 4K Ultra-HD Video", IEEE, 2015, Institute of Image Communication and Network Engineering, Shanghai Jiao Tong University; consisting of 6-pages.

Zhang et al., A Frequency-Based Fast Block Type Decision Algorithm for Intra Prediction in H.264/AVC High Profile, IEEE, 2008, Graduate School of Information, Production and Systems, Waseda University, pp. 1292-1295; consisting of 4-pages.

Extended European Search Report dated May 26, 2020, for corresponding European Application No. 20166692.2; consisting of 9-pages.

\* cited by examiner

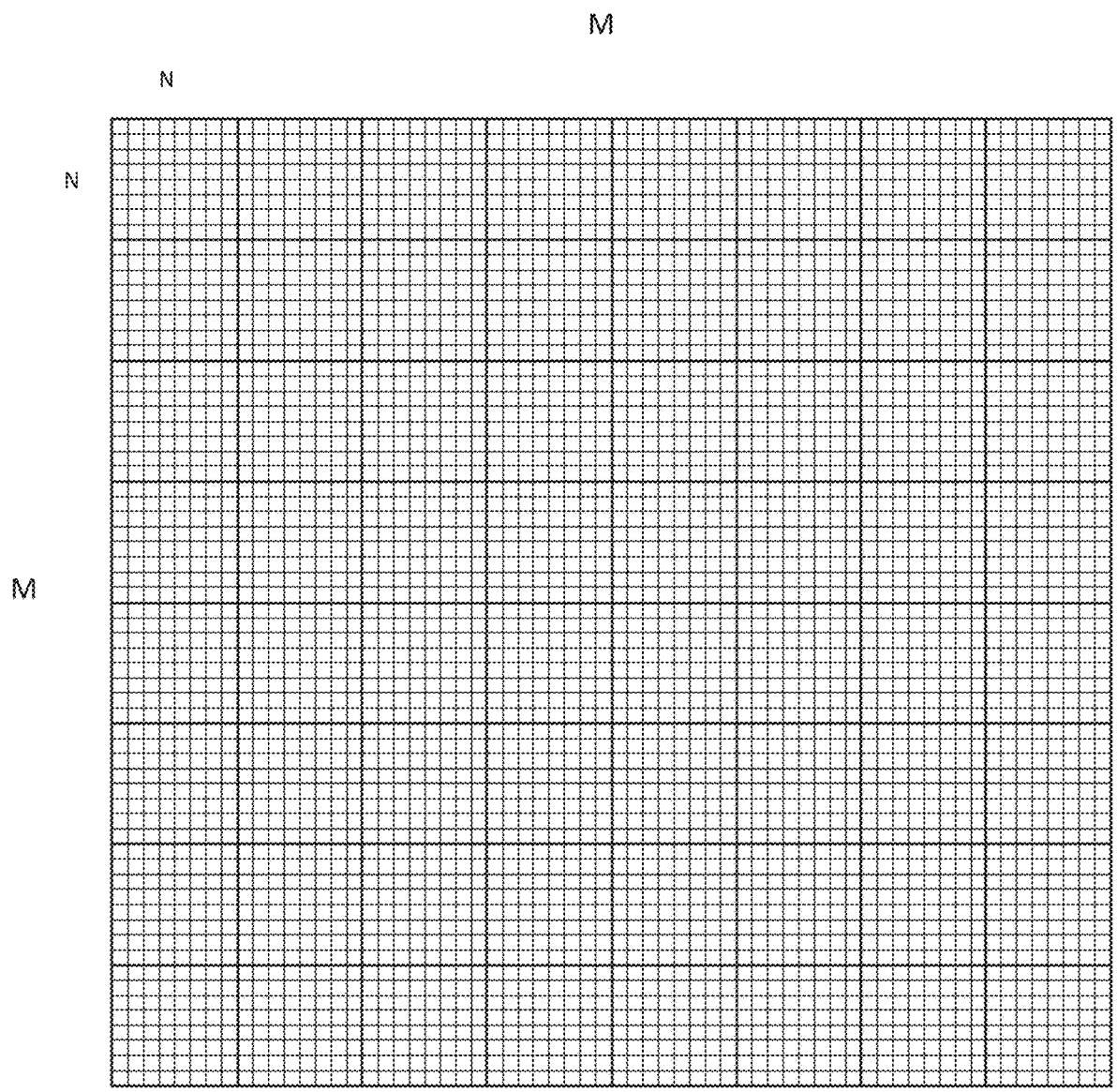
Fig 1 – MxM camera block divided into NxN blocks, M=64, N=8

EARLY INTRA CODING DECISION (PPH)

CROSS-REFERENCE TO RELATED APPLICATION

This application is related to and claims priority to Norwegian Patent Application No. 20190764, filed on Jun. 20, 2019, entitled EARLY INTRA CODING DECISION, the entirety of which is incorporated herein by reference.

FIELD

The present disclosure relates to intrablock coding/decoding in video compression systems in computer devices or systems.

BACKGROUND

Transmission of moving pictures in real time is employed in several applications such as, but not limited to, video conferencing, net meetings, television (TV) broadcasting, and video telephony. Representing moving pictures requires bulk information as digital video typically is described by representing each pixel in a picture with 8 bits, which is equal to 1 byte. Such uncompressed video data results in large bit volumes and cannot be transferred over conventional communication networks and transmission lines in real time due to limited bandwidth.

Thus, enabling real time video transmission requires a large extent of data compression. Data compression may, however, compromise the picture quality. Therefore, great efforts have been made to develop compression techniques allowing real time transmission of high-quality video over bandwidth limited data connections. In video compression systems, the main goal is to represent the video information with as little capacity as possible. Capacity is defined with bits, either as a constant value or as bits/time unit. In both cases, the goal is to reduce the number of bits. As the devices used for video compression are getting smaller, it is also a goal to reduce the required processor capacity. A conventional video coding method is described in the Moving Picture Experts Group (MPEG) and H.26* standards, VPX and AV1. The video data undergoes four main processes before transmission (i.e., the prediction process, the transformation process, the quantization process, and the entropy coding).

The prediction process reduces the number of bits required for each picture in a video sequence to be transferred. The process takes advantage of the similarity of parts of the sequence with other parts of the sequence. Since the predictor part is known to both encoder and decoder, only the difference must be transferred. This difference typically requires much less capacity for its representation. The prediction is mainly based on vectors representing movements. The prediction process is conventionally performed on square block sizes (e.g., 16×16 pixels or 64×64 pixels). In some cases, predictions of pixels based on adjacent pixels in the same picture, rather than pixels of preceding pictures, are used. This is referred to as intra prediction or intra-frame coding. Intra-frame coding is used in video coding (compression).

Intra-frame prediction exploits spatial redundancy, i.e. correlation among pixels within one frame, by calculating prediction values through extrapolation from already coded pixels for effective delta coding. It is one of the two classes of predictive coding methods in video coding. Its counterpart is inter-frame prediction which exploits temporal redundancy. Temporally independently coded so-called intra frames use only intra coding. The temporally coded predicted frames (e.g. MPEG's P- and B-frames) may use intra- as well as inter-frame prediction.

Usually known adjacent samples (or blocks) are above, above left, above right, and left.

Usually only few of the spatially closest known samples are used for the extrapolation. Block-based (frequency transform) formats prefill whole blocks with prediction values extrapolated from usually one or two straight lines of pixels that run along their top and left borders.

The term intra-frame coding refers to the fact that the various lossless and lossy compression techniques are performed relative to information that is contained only within the current frame, and not relative to any other frame in the video sequence. In other words, no temporal processing is performed outside of the current picture or frame.

The residual represented as a block of data still contains internal correlation. A conventional method which takes advantage of this and performs a two-dimensional block transform. In some standards an integer-type transform is used, and in other standards a Discrete Cosine Transform (DCT) is used. The dimension (N×N) of the blocks may vary, but in e.g. VP9, 4×4, 8×8, 16×16 and 32×32 DCT transforms may be used. This transforms N×N pixels into N×N transform coefficients which can usually be represented by fewer bits than the pixel representation. Transform of a N×N array of pixels with internal correlation may result in a N×N block of transform coefficients with much fewer nonzero values than the original N×N pixel block.

Video encoding for HD formats increases the demands for memory and data processing and requires efficient and high bandwidth memory organizations coupled with compute intensive capabilities. Due to these multiple demands, a flexible parallel processing approach must be found to meet the demands in a cost-effective manner.

Intra-frame coding is normally a more costly coding technique in terms of data processing than inter-frame coding. However, inter-frame may in some cases have a negative impact on the visual quality of the decoded video image. E.g. in uniform regions of the video picture that still do not have the same color and/or brightness consistently through the region, will be perceived as "flat" and unnaturally by a viewer. The same would be the case on the background of moving objects, where viewers would actually be able to see remains of frames of the inter coding blocks after an object has passed—trailing artifacts—which would be perceived as visual noise.

Therefore, there is a need for achieving a method for detecting these cases and utilizing intra-coding to avoid visual noise from the inter-coding without significantly increasing the consumption of processor capacity.

SUMMARY

In view of the above, an object of the present disclosure is to overcome or at least mitigate drawbacks of prior art video conferencing systems.

This object is achieved, in a first aspect, by a method of video coding implemented in a processor device for preparing to determine whether a M×M pixel block in a video image, which can be divided into an integer number of N×N blocks, should be coded by means of intra coding, the method further comprising: calculating DCT coefficients of the N×N blocks; calculating DC values of the N×N blocks; comparing the DCT coefficients of the N×N blocks with a predefined first threshold, if all the DCT coefficients of the N×N blocks are below a predefined first threshold, then assigning a "0" to the respective N×N block, if not, assigning a "1" to the respective N×N block, resulting in a first (M/N)×(M/N) block with one corresponding first assignment for each (M/N)×(M/N) block; and calculating DCT coefficients of the DC values of the N×N blocks, if all the DCT coefficients of the DC values of N×N blocks are below a predefined second threshold, then assigning a "0" to the respective N×N block, if not, assigning a "1" to the respective N×N block, resulting in a second (M/N)×(M/N) block with one corresponding second assignment for each (M/N)×(M/N) block, if the first assignment for each (M/N)×(M/N) block and the corresponding second assignment for each (M/N)×(M/N) block are zero, then the M×M pixel block is determined to be coded by means of intra coding.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 1 illustrates the pixels in a 64×64 camera block, divided into 8×8 subblocks;

DETAILED DESCRIPTION

Figure 2A:
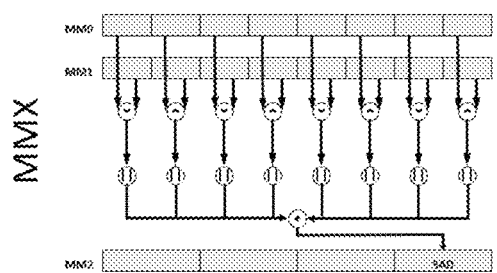
FIG. 2a-2d illustrates the MMX 64 bit instruction set development.

According to embodiments of the present invention as disclosed herein, the above-mentioned disadvantages of solutions according to prior art are eliminated or at least mitigated.

FIG. 1 illustrates a 64×64 camera block divided into 64 8×8 blocks which means 64 pixels in each 8×8 block. This division/grouping of pixels, which complies with the above-mentioned VP9, AV1 and H.265 standard, will be referred to in the following description.

The basic idea of the present invention is to use large intra blocks for uniform regions of the video making early decision of intra block coding based on DCT and DC calculations. This will increase the visual quality at a moderate cost since further investigations, mode decision, motions search and so on can be avoided by utilizing parallel calculation.

In certain embodiments according to the present application, this is achieved by a first step calculating the DCT of each 8×8 block and then possibly using the DC value to calculate the residual. To find out if that DC prediction is a good choice for the residual of the 8×8 block, the coefficients of the corresponding DCT are compared with a first predefined threshold. When all these coefficients are below a certain threshold, that DC prediction is considered as being a good choice for the 8×8 block. It will be apparent in the following discussion that DC prediction as a good choice would mean selecting intra coding.

The inventor has realized that this is a good match with the MMX 64 bit Intel vector instruction set. MMX is a single instruction, multiple data (SIMD) instruction set designed by Intel, introduced in 1997 with its P5-based Pentium line of microprocessors, designated as "Pentium with MMX Technology". It developed out of a similar unit introduced on the Intel i860, and earlier the Intel i750 video pixel processor. MMX is a processor supplementary capability that is supported on recent IA-32 processors by Intel and other vendors. MMX defines eight registers, called MM0 through MM7, and operations that operate on them. Each register is 64 bits wide and can be used to hold either 64-bit integers, or multiple smaller integers in a "packed" format: a single instruction can then be applied to two 32-bit integers, four 16-bit integers, or eight 8-bit integers at once.

Note that from now on, the MMX set will be referred to as the MMX 64 bit Intel vector instruction-set or any other vector instruction set with the similar characteristics and performance.

The AVX512 64 bit instruction set allows for calculating the DCT value of 8 8×8 blocks in parallel using e.g. the 64 bit_mm512_sad_epu8 instruction. The outcome of the 8×8 DCT can be stored in a first 64 bit bitmask, since an 8×8 block have 64 pixels and the DCT of the 8×8 block has 64 coefficients. In this mask a "1" means that the coefficient is above the first predefined threshold, and "0" means that the coefficient is below the first predefined threshold. If all the 64 coefficients are zero, then the 64 bit bitmask is zero and the DC prediction of the 8×8 block is a good choice.

In a 64×64 block there are all together 64 8×8 blocks. In certain embodiments, for each 8×8 block a "1" is set if at least one coefficient is nonzero and a "0" if all coefficients are zero, resulting in a second 64 bit bit mask on a higher level, this one for all the 64 8×8 blocks in the 64×64 block. If all the 64 coefficients are zero, then the 64 bit bitmask is zero, and the DC prediction of the 64×64 block may be a good choice.

However, it is a possibility that one or several 8×8 blocks have uniform but different color from the other 8×8 blocks, e.g. a "chessboard" pattern. In such cases, the test above be unsatisfactory, and possibly result in a "flat" picture are instead of a chessboard pattern.

To compensate for this potential distortion, the inventor suggests calculating a third 64 bit bitmask. This is done by calculating the DCT of the DCs of the 64 8×8 block already being calculated. This require that the DC values of each 8×8 block of the entire 64×64 block are stored in an 8×8 block, where each "pixel" contains the DC value of one 8×8 block. The DCT of this 8×8 block is then calculated, then each coefficient in the 8×8 block of "DCT of DCs" is compared with a second predefined threshold value. This generates a third 64 bit bit mask, where "1" means that the coefficient is above the second predefined threshold, and "0" means that the coefficient is below the second predefined threshold.

Note that the inventor has realized that in most cases, the second predefined threshold should be somewhat lower than the first predefined threshold.

If both the second and third (and implicitly the first) 64 bit bitmask are zero, then the probability that the picture content of the 64×64 camera block is uniform, and not chessboard-like, is considered to be high. Then the criterion for intra block encoding according to the present invention is satisfied, and intra block encoding would be selected.

The extra process of determining intra/not intra on the 64×64 block will be done at a relatively low cost, the improvement of the decoded picture will at least in some parts be considerable, as the visual artefacts particularly on uniform surfaces are avoided by skipping 64×64 inter coding where this is a problem.

The reason why the determining process can be carried out at a relatively low processing cost, is as earlier indicated because it fits well with the current Intel vector instruction set.

This was based on an MMX 64 bit instruction set when introduced in 1997. In this MMX 64 bit instruction set, the Sum of Absolute Differences (SAD) instruction_mm_sad_pu8 calculated the absolute sum of 8 pixels with 8 other pixels.

However, when 128 bit SSE2 later was introduced the SAD instruction_mm_sad_epu8 unexpectedly returned the absolute sum in chunks of 8 pixels and not in chunks of 16 pixels, as illustrated in FIG. 2a. The reason was that the underlying MMX hardware was reused.

Figure 2B:
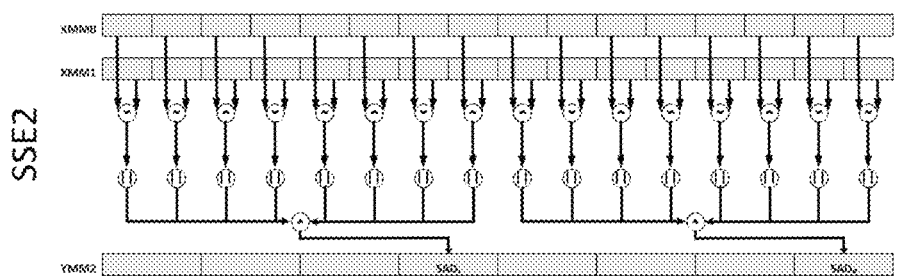

By the introduction of 256 bit AVX2, the same happened, i.e. the SAD instruction_mm256_sad_epu8 still returned the absolute sum in chunks of 8 pixels, as illustrated in FIG. 2b.

Figure 2C:
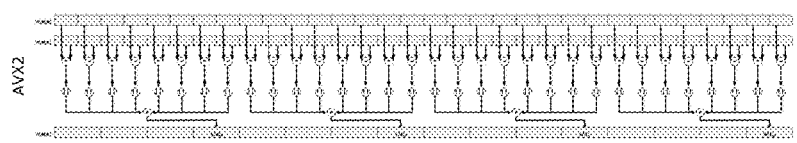

Further, by the introduction of 512 bit AVX512, the same happened over again, the SAD instruction_mm512_sad_epu8 returned the absolute sum in chunks of 8 pixels, as illustrated in FIG. 2c.

Figure 2D:
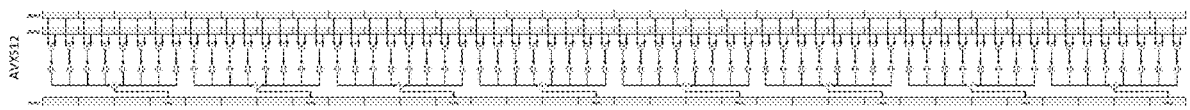

When calculating the SAD of all the 64 pixels, as illustrated in FIG. 2d, this is bit of a disadvantage, since one needs to collect the 8 partial SADs which leads to numerous additional instructions.

However, this can be utilized as an advantage in the early intra coding decision. Returning now to FIG. 1, the upper line of the 64×64 block includes 8 respective upper lines of the 8 uppermost 8×8 blocks in the 64×64 block. To calculate the DC and the DCT coefficients of an 8×8 block, the basic operation is to calculate the sum of the pixel values. According to an embodiment of the present application, each summation is done in parallel for all the 8 8×8 blocks in the 64×64 block. This is possible since the SAD instruction of 512 bit AVX512 returns as already mentioned the absolute sum in chunks of 8 pixels. 512 divided by 8 is 64, so 8 lines of 8 8×8 blocks can be summed in parallel.

The actual function that can be used is as earlier mentioned the vp9_avx512_block_average, which e.g. calculates the 64 DC values of the 8 8×8 blocks in a 64×64 block using the 512 bit SAD instruction. According to measurements this function uses approximately only 0.1% of the CPU load of the VP9 encoder.

Figure 3A:
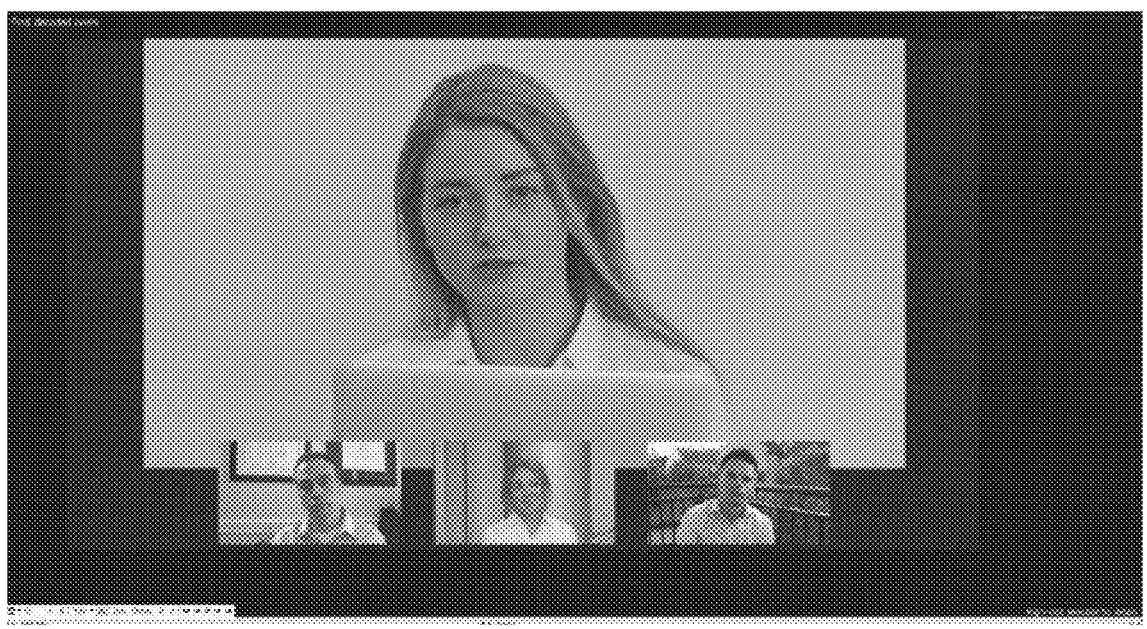
FIG. 3a is an encoded/decoded video image.
Figure 3B:
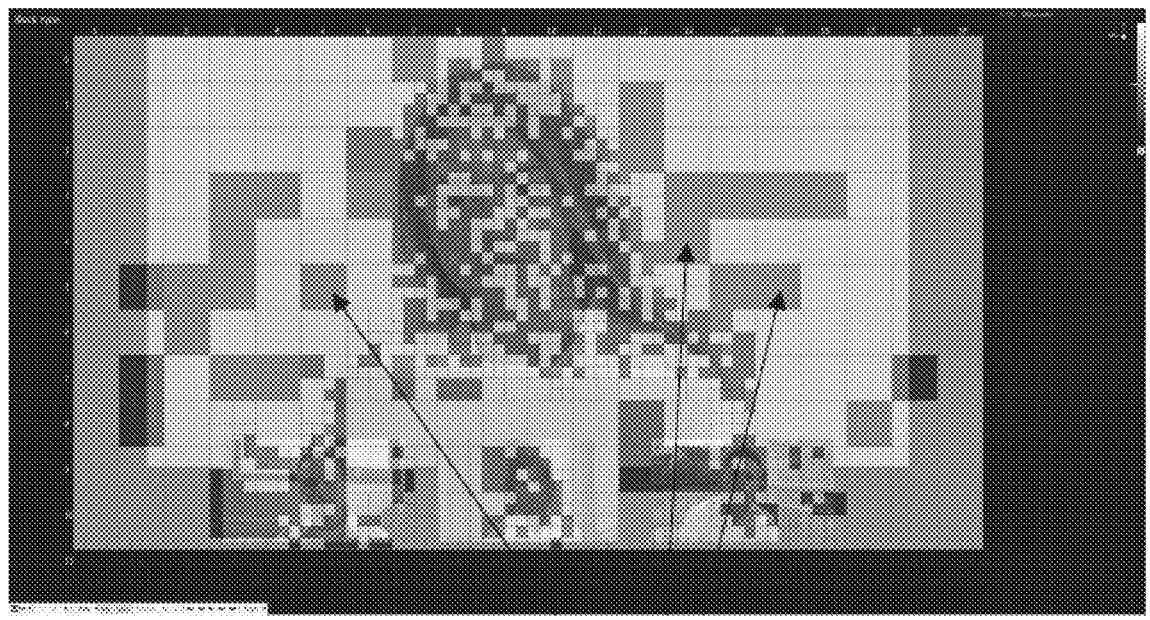
FIG. 3b is the encoded/decoded video image of FIG. 3a with intra coded blocks marked in light gray.

Turning now to FIG. 3, FIG. 3b shows an encoded/decoded video image of FIG. 3a with block type information. The light grey blocks pointed out with arrows are decided to be encoded as 64×64 intra according to the present invention in contrast to what would have been done according to standard encoding/decoding, e.g. VP9 without using the decision according to the present invention. Generally, VP9 or similar standard uses 64×64 intra much less frequently on uniform areas, resulting in more visual distortion in these areas.

The embodiments herein may be implemented in a plurality of physical entities, such as an arrangement comprising said one or more physical entities, i.e. the embodiments may be implemented in a distributed manner, such as on a cloud system, which may comprise a set of server machines.

As used herein, the terms "first", "second", "third" etc. may have been used merely to distinguish features, apparatuses, elements, units, or the like from one another unless otherwise evident from the context.

As used herein, the expressions "in some embodiments" and "in certain embodiments" have been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

What is claimed is:

1. A method of video coding implemented in a processor device for preparing to determine whether a M×M pixel block in a video image, which can be divided into an integer number of N×N blocks, should be coded by means of intra coding, the method comprising:
    calculating DCT coefficients of the N×N blocks;
    calculating DC values of the N×N blocks;
    comparing the DCT coefficients of the N×N blocks with a predefined first threshold, if all the DCT coefficients of the N×N blocks are below a predefined first threshold, then assigning a "0" to the respective N×N block, if not, assigning a "1" to the respective N×N block, resulting in a first (M/N)×(M/N) block with one corresponding first assignment for each (M/N)×(M/N) block; and
    calculating DCT coefficients of the DC values of the N×N blocks, if all the DCT coefficients of the DC values of N×N blocks are below a predefined second threshold, then assigning a "0" to the respective N×N block, if not, assigning a "1" to the respective N×N block, resulting in a second (M/N)×(M/N) block with one corresponding second assignment for each (M/N)×(M/N) block, if the first assignment for each (M/N)×(M/N) block and the corresponding second assignment for each (M/N)×(M/N) block are zero, then the M×M pixel block is determined to be coded by means of intra coding.

2. The method of claim 1, wherein the DCT coefficients of the respective N×N blocks are stored in a first 64 bit bitmask.

3. The method of claim 1, wherein the respective (M/N)×(M/N) blocks are stored in a second 64 bit bitmask.

4. The method of claim 1, wherein M=128, M=64, or M=32.

5. The method of claim 1, wherein N=4, N=8, N=16, or N=32.

6. The method of claim 1, wherein the steps of calculating are implemented by the SAD instructions of 512 bit AVX512.

7. A video processor device for video coding adjusted to determine whether a M×M pixel block in a video image, which can be divided into an integer number of N×N blocks, should be coded by means of intra coding, where the video processor device is adjusted to implement the following steps:
    calculating DCT coefficients of the N×N blocks;
    calculating DC values of the N×N blocks;
    comparing the DCT coefficients of the N×N blocks with a predefined first threshold, if all the DCT coefficients of the N×N blocks are below a predefined first threshold, then assigning a "0" to the respective N×N block, if not, assigning a "1" to the respective N×N block, resulting in a (M/N)×(M/N) block with one corresponding first assignment for each (M/N)×(M/N) block; and
    calculating DCT coefficients of the DC values of N×N blocks, if all the DCT coefficients of the DC values of N×N blocks are below a predefined second threshold, then assigning a "0" to the respective N×N block, if not, assigning a "1" to the respective N×N block, resulting in a (M/N)×(M/N) block with one corresponding second assignment for each (M/N)×(M/N) block, if the first assignment for each (M/N)×(M/N) block and the corresponding second assignment for each (M/N)×(M/N) block are zero, then the M×M pixel block is determined to be coded by means of intra coding.

8. The video processor device of claim 7, wherein the DCT coefficients of the respective N×N blocks are stored in a first 64 bit bitmask.

9. The video processor device of claim 7, wherein the respective (M/N)×(M/N) blocks are stored in a second 64 bit bitmask.

10. The video processor device of claim 7, wherein M=128, M=64, or M=32.

11. The video processor device of claim 7, wherein N=4, N=8, N=16, or N=32.

12. The video processor device of claim 7, wherein the steps of calculating are implemented by the SAD instructions of 512 bit AVX512.

* * * * *